G. W. BARRINGER.
AUTOMOBILE SIGNAL.
APPLICATION FILED JUNE 4, 1913.
1,118,525.
Patented Nov. 24, 1914.
2 SHEETS—SHEET 1.
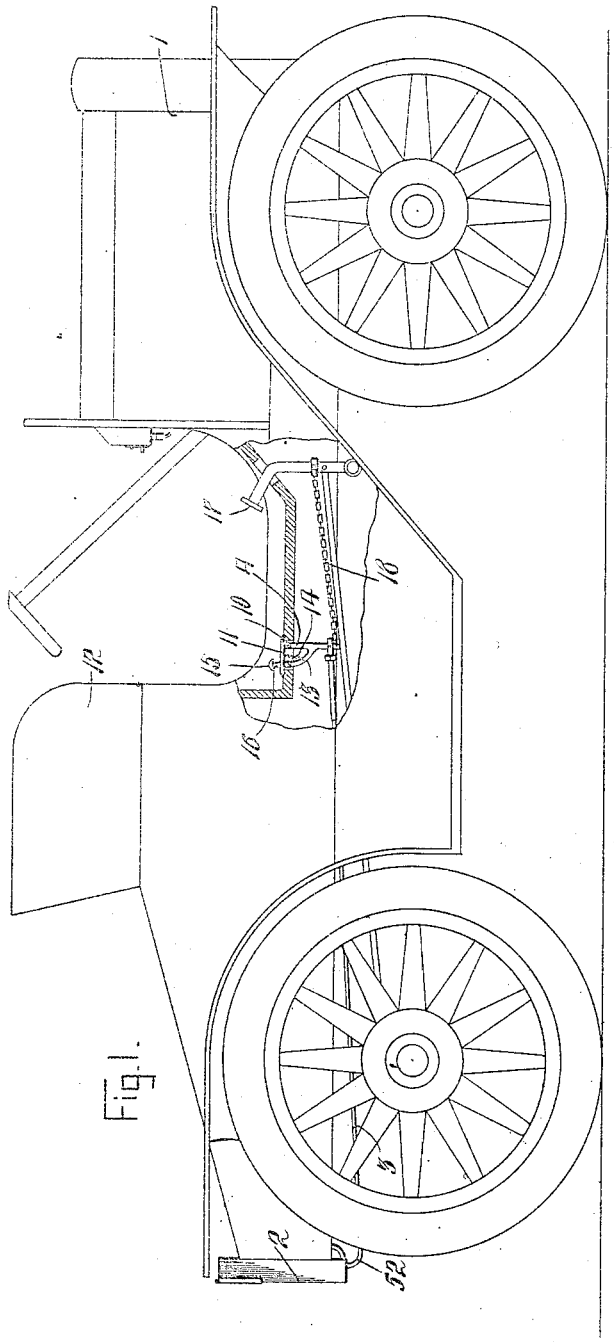
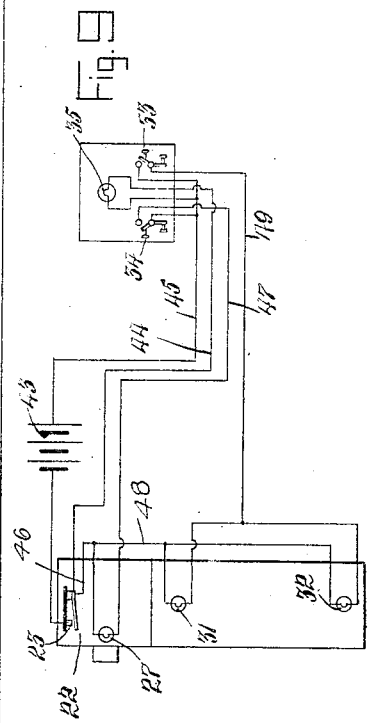
WITNESSES
C. K. Reichenbach.
A. L. Kitchin.
INVENTOR
George W. Barringer
BY Munn & Co.
ATTORNEYS

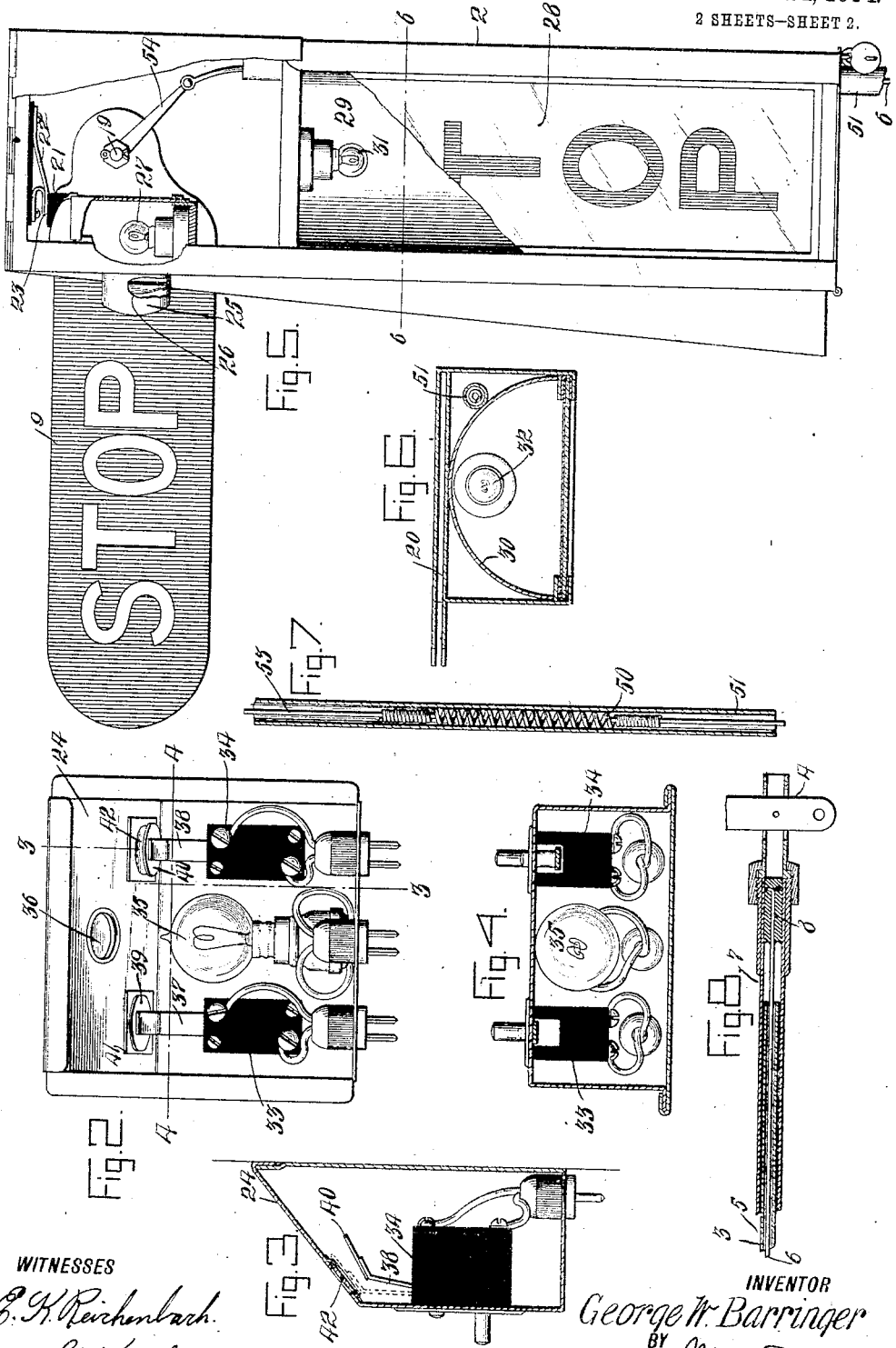

UNITED STATES PATENT OFFICE.

GEORGE WASHINGTON BARRINGER, OF LAWRENCE, NEW YORK.

AUTOMOBILE-SIGNAL.

1,118,525.   Specification of Letters Patent.   Patented Nov. 24, 1914.

Application filed June 4, 1913. Serial No. 771,613.

*To all whom it may concern:*

Be it known that I, GEORGE W. BARRINGER, a citizen of the United States, and a resident of Lawrence, in the county of Nassau and State of New York, have invented a new and Improved Automobile-Signal, of which the following is a full, clear, and exact description.

This invention relates to improvements in signal devices for automobiles, and has for an object to provide an improved structure adapted to be operated from the seat of an automobile and when so operated will throw out or move out an arm to one side at the rear of the automobile.

A further object of the invention is to provide an improved automobile signal arranged at the rear of the automobile and formed so that when the arm is thrown out various lamps will be lighted in order to light up the arm and provide a visual signal to any one in the rear.

A still further object of the invention is to provide an automobile signal adapted to be operated from the seat of the automobile while the signal arm is arranged at the rear of the automobile, the same being associated with a plurality of lights having a telltale at the front of the automobile for indicating to the operator the position of the signal arm and other signal devices.

In carrying out the objects of the invention, a signal arm and signal lights with suitable operating mechanism are provided which are adapted to be positioned on the rear of the body of an automobile. Operating means are connected to the arm and other devices which extend to the front of the automobile in order that the arm may be operated by the foot and the lights may be controlled by suitable switches at a convenient point. An operating member extends from the arm to an operating lever at the front so that the same may be quickly operated at any time. In addition to the operating lever at the front, a connection is provided between the operating rod or member and the brake treadle whereby when the brake treadle is depressed the signal arm will be raised.

A practical embodiment of the invention is represented in the accompanying drawings forming a part of this specification in which similar characters of reference indicate corresponding parts in all the views.

Figure 1 is a side view of an automobile with an embodiment of the invention applied thereto, certain parts of the automobile being shown broken away; Fig. 2 is a rear view of a telltale light and switch device; Fig. 3 is a section through Fig. 2 on the line 3—3; Fig. 4 is a section through Fig. 2 on the line 4—4; Fig. 5 is an enlarged side view of the signal device, certain parts being broken away; Fig. 6 is a section through Fig. 5 approximately on the line 6—6; Fig. 7 is a longitudinal vertical section through part of a guiding rod disclosing the arm controlling spring; Fig. 8 is a fragmentary sectional view through a portion of a Bowden wire power transmission; and Fig. 9 is a diagram showing the arrangement and wiring of the lamps embodying certain features of the invention.

Referring to the accompanying drawings by numerals, 1 indicates an automobile of any kind provided with a signal box or housing 2 containing a signal arm, signal lights, and various other associated devices. The signal arm is operated by a Bowden wire 3 which extends to a point adjacent the seat of the automobile and is connected with a pivotally mounted lever 4. In Fig. 8 the Bowden wire 3 is disclosed in which a stationary tube 5 is shown through which a wire 6 is adapted to move back and forth, the wire 6 being connected to a guiding tube 7 in any suitable way, as for instance by the filling block or lug 8. The lever 4 is connected with the sleeve or tube 7 and is moved back and forth thereby so as to shift the position of the wire 6 and consequently to actuate the arm 9 and associated parts hereinafter fully described. The lever 4 is pivoted at 10 to a suitable plate 11 secured to the body of the automobile near the seat 12. The lever 4 is provided with an arm 13 to which is connected a spring 14 for resiliently holding the arm 13 in its raised position. Pivotally connected to the arm 13 is a foot treadle or member 15 formed with a notch 16 adapted to engage the plate 11 in order to be locked in a lowered position and consequently hold the lever 4 in a forward position and the arm 9 (Fig. 5) in a raised or elevated position. When it is not convenient, and when it is practically impossible to depress the treadle 15, the foot may be applied to the usual brake treadles 17 and not only will the brake be applied but power will be transmitted to a chain or cable for moving the same forward for elevating or setting at danger the arm 9. It will be observed that the treadle or member 15 may be operated independently of the treadle 17, but treadle 17 cannot be operated independently of the lever 4 whereby the arm will be positively raised whenever the brake is applied.

The mechanism just described is required in order to properly operate the signal arm 9 at proper times. The signal arm 9 is pivotally mounted on a shaft 19 (Fig. 5) in the housing 2 and operates in a compartment 20. When not in use the arm 9 moves pivotally downward into the compartment 20, but when set at danger the same is swung from the compartment 20 to the position shown in Fig. 5. The arm 9 is provided with an insulating block 21 of any desired material, and is so positioned on the arm 9 as to engage a spring 22 and force the same against a spring post 23. The spring 22 acts as a binding post through which current is adapted to pass as well as post 23 so that when the arm 9 is raised as shown in Fig. 5, current will pass from one post to the other and through a suitable circuit shown in Fig. 9 hereinafter fully described, the circuit including various lamps arranged in the housing 2 and in the housing 24 at or near the front of the automobile. Arranged adjacent the arm 9 is a tubular extension 25 provided with lens 26 through which the rays of light from the lamp 27 may be projected against the arm 9 when in a raised position. This is of advantage at night for disclosing the position of the arm to any one in the rear. In addition to providing these means for disclosing the presence of the automobile and the movements thereof, a plate 28 is provided in front of chamber 29 formed with the word "Stop" arranged thereon in colored letters. The chamber 29 is provided with a reflecting member 30 for reflecting the light from the lamps 31 and 32 through the word "Stop" or other word provided on the plate 28. By providing a swinging arm and also a light, two signals are presented which supplement each other for clearly indicating the driver's intention. It is very desirable to have the swinging arm and light for lighting the same in addition to the light signal, as in rough weather when riding in the country the sign in the upright case which is a light signal will sometimes become covered with mud. This will obliterate or hide to a greater or less extent the upright or light signal so that the lighted swinging arm remains for indicating the intention of the driver. The lamps 27 and the lamps 31 and 32 are on independent circuits controlled by any desired kind of snap switches 33 and 34 arranged in the housing 24. A telltale lamp 35 is provided in the housing 24 and is connected with the circuit closed whenever the springs 22 and 23 are brought into contact. In this way the telltale lamp will shine through a window 36 whenever the arm 9 is at danger. Connected with one of the buttons of the switches 33 and 34 are arms 37 and 38 having covers or shields 39 and 40 designed to cover at times windows 41 and 42. For instance, when switch 34 is closed, current will pass from a suitable source of supply to lamp 27 so as to light the arm 9. This fact will be told or indicated by light from the lamp 35 shining through window 42, the cover 40 being removed at the time the button-carrying member 38 is depressed.

Referring more particularly to Fig. 9, the circuits for the various lamps and switches will be observed wherein it will be seen that when spring 22 is brought into contact with spring 23 current will pass from battery 43 through contact spring 23, spring 22, wire 44, telltale lamp 35, and through the common return 45 back to battery 43. If switch 34 is closed while springs 22 and 23 are in contact, current will flow from battery 43, through contacts 23 and 22, wire 46, lamp 27, wire 47, switch 34, and through the common return 45 back to the battery. When switch 33 is closed, current will pass from battery 43, through contacts 22 and 23, wire 46, wire 48, lamps 31 and 32, wire 49, switch 33, and from thence through common return 45 back to the battery. It will be observed from tracing these circuits that lamps 31 and 32 are included in one circuit, lamp 27 is included in a second circuit, and lamp 35 is included in a third circuit.

When operating the device either treadle 15 or 17 is depressed, which will give wire 3 a longitudinal movement, or rather the wire 6 forming part of Bowden wire 3 will be given a longitudinal movement toward the front. Wire 6 is connected with a spring 50 (Fig. 7) which is arranged in a tube 51 in the housing 2. Upon a forward movement of wire 6, the same will pull downwardly on spring 50 as the Bowden wire 3 has been curved at point 52 so as to properly enter the housing 1 from the bottom. The downward movement of the spring 50 will cause the downward movement of the bar or rod 53 which is connected to an arm 54 rigidly secured to the end of the signal arm 9. When the spring 50 is moved downward the same is brought under tension and power is conveyed to arm 9 whereby the same is raised pivotally on the shaft 19. When the wire 6 is released the same will move back to its original position and the arm 9 will drop by gravity to a position in the chamber 20. If desired, however, the spring 14 in connection with the lever 4 at the front of the automobile may be made sufficiently strong for forcing the lever 4 rearward when released and thereby force the wire 6 upwardly against the spring 50 and cause the spring 50 to positively close the arm 9.

Having thus described my invention I claim as new and desire to secure by Letters Patent:—

1. In a signal device for vehicles, a housing adapted to be secured to the rear of the vehicle, an arm pivotally mounted in said housing and adapted to swing therefrom, a transparent signal arranged on one side of said housing, a lamp for lighting said transparent signal, a lamp for lighting said signal arm when the same is swung to an exposed position, and a circuit for each of said lamps, both of said circuits including a switch closed by said signal arm when the same is swung to an exposed position, and a source of current, each of said circuits being provided with a manually operated switch for independently controlling the current to the lamps.

2. In a signal device for vehicles, a signal arm, a housing for said signal arm, means for swinging said signal arm into said housing and from said housing, a lamp for lighting said signal arm, a transparent signal panel, a lamp for lighting said panel, an independent circuit for each of said lamps, a manually operated switch for each of said circuits, a single source of current for both of said circuits, and a single switch for both of said circuits operated to be closed by said arm when the same is swung to an exposed position.

3. In a signal device for vehicles, a pivotally mounted signal arm arranged at the rear of the vehicle, manually operated means for moving said signal arm, a plurality of lamps arranged adjacent said signal arm, one of said lamps being adapted to light said signal arm when the same is moved to a danger position, and the remaining lamps being adapted to act as a light for a signal plate, a signal plate arranged adjacent said pivotally mounted arm, a circuit closed by said signal arm when the same is swung to an exposed position including a telltale lamp in the front of the vehicle, an independent circuit for each of said remaining lamps, both of said last mentioned circuits including a switch closed by the pivotally mounted arm, a manually operated switch for each of said last mentioned circuits arranged adjacent said telltale lamp, and shutter mechanism to show whether the first mentioned switch has been operated to an "on" and "off" position.

4. In a signal device for vehicles, a movable signal arm mounted on the vehicle, an electrical switch adapted to be closed by said arm when the arm is moved to an exposed position, means for manually operating said arm so as to move the same to an exposed position, a circuit including said switch, a source of current, and a telltale lamp for giving a signal when said arm has been raised to an exposed position, a plurality of signal lamps arranged adjacent said arm, one of said lamps lighting said arm and the other presenting an auxiliary signal, a manually operated switch arranged adjacent said telltale lamp for each of the lamps positioned adjacent said arm, and telltale means operated by said switches for indicating whether or not said lamps adjacent said signal arm are lighted.

In testimony whereof I have signed my name to this specification in the presence of two subscribing witnesses.

GEORGE WASHINGTON BARRINGER.

Witnesses:
RICAHRD F. MACK,
HENRY WORTHINGTON.